(12) United States Patent
Lin et al.

(10) Patent No.: US 7,836,390 B2
(45) Date of Patent: Nov. 16, 2010

(54) STRATEGIES FOR PROCESSING ANNOTATIONS

(75) Inventors: Zhouchen Lin, Beijing (CN); Mingqing Xu, Beijing (CN); Jian Wang, Beijing (CN)

(73) Assignee: Microsoft Corporation, Redmond, WA (US)

(*) Notice: Subject to any disclaimer, the term of this patent is extended or adjusted under 35 U.S.C. 154(b) by 1023 days.

(21) Appl. No.: 11/275,750

(22) Filed: Jan. 26, 2006

(65) Prior Publication Data

US 2007/0174761 A1  Jul. 26, 2007

(51) Int. Cl.
G06F 17/00 (2006.01)
(52) U.S. Cl. .................... 715/230; 715/233; 715/243
(58) Field of Classification Search .............. 715/230, 715/233, 243
See application file for complete search history.

(56) References Cited

U.S. PATENT DOCUMENTS

| 5,675,710 | A | 10/1997 | Lewis |
| 5,832,474 | A | 11/1998 | Lopresti et al. |
| 6,279,014 | B1 | 8/2001 | Schilit et al. |
| 6,484,156 | B1 * | 11/2002 | Gupta et al. ................ 707/1 |
| 6,687,876 | B1 * | 2/2004 | Schilit et al. ............. 715/231 |
| 6,721,921 | B1 | 4/2004 | Altman |
| 6,973,460 | B1 * | 12/2005 | Mitra ................... 707/103 R |
| 7,502,995 | B2 * | 3/2009 | Takagi et al. ............. 715/234 |

FOREIGN PATENT DOCUMENTS

CN    1609846 A    4/2005

OTHER PUBLICATIONS

Berque, et al., "Using pen-based computers across the computer science curriculum", Proceedings of the 35th SIGCSE technical symposium on Computer science education, p. 61-65, published 2004.*
Perlin, et al., "Pad: an alternative approach to the computer interface", Proceedings of the 20th annual conference on Computer graphics and interactive techniques, p. 57-64, published 1993.*
Brush, et al., "Robust Annotation Positioning in Digital Documents," SIGCHI'01, Mar. 31 to Apr. 4, 2001, Seattle, WA, published by ACM, Cat. No. 1-58113-327-8/1/0003, 8 pages.
Reynolds, et al., "Architectures for Efficient Scribble Matching," HP Laboratories Bristol, HPL-94-62, Jul. 1994, 9 pages.
Kort, et al., "Parse-tree annotations meet re-engineering concerns", Source Code Analysis and Manipulation, 2003 Proceedings, Third IEEE International Workshop, Sep. 2003, pp. 161-170.
Mukheriee, et al., "Bootstrapping Semantic Annotation for Content-Rich HTML Documents", Data Engineering, 2005, ICDE Proceedings, Apr. 2005, pp. 583-593.

* cited by examiner

*Primary Examiner*—Amelia Rutledge
(74) *Attorney, Agent, or Firm*—Lee & Hayes, PLLC

(57) ABSTRACT

Annotation engines are described for handling annotations added to a base document. The annotation engines automatically classify the type of annotations, including, but not limited to: a highlight annotation; a blob annotation (comprising an enclosing-type annotation); an underline annotation; a vertical bracket annotation; a call-out annotation; and a free-note annotation. The annotation engines accept input in the form of a hierarchical tree of document elements and generate an output in the form of a hierarchical tree of annotation elements. Among other uses, a reflow engine can use the output of the annotation engines to properly reposition annotations within a layout-modified base document.

13 Claims, 15 Drawing Sheets

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware.

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware.

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware.

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware.

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware.

*good!*
802

Fig. 8

Generally, any of the functions described with reference to the figures can be implemented using software, hardware (e.g., fixed logic circuitry), manual processing, or a combination of these implementations. The term "logic," "module" or "functionality" as used herein generally represents software, hardware, or a combination of software and hardware.

*ask tony* → 702

Fig. 7

STRATEGIES FOR PROCESSING ANNOTATIONS

BACKGROUND

Digitizing tablets comprise a tablet and a writing mechanism (commonly referred to as a pen or stylus). A user can use the digitizing tablet to enter any information in freehand fashion. For instance, the user can use the digitizing tablet to enter writing information (e.g., alpha-numeric information) or to make drawings. Generally, the user enters any such information in one or more "ink strokes."

In a special case, the user may use the digitizing tablet to enter supplemental information "onto" a base document, such as a word processing document, an Email, a PDF document, a markup language document, and so forth. That is, the user may enter supplemental information to mark certain parts of the base document in various ways. For example, the user may choose to underline a selected passage of text in the base document. Or the user may choose to draw a circle around a selected passage of text in the base document, and so on. In general, the user can apply such supplemental information to simulate the kinds of marks that the user might make when reviewing a hard-copy version of the base document, e.g., so as to draw emphasis to certain parts of the base document, to make certain corrections, and so forth.

All such supplemental marks are referred to herein as "annotations." The digitizing tablet can store the annotations along with the base document. When the base document is reproduced, the digitizing tablet can redisplay the annotations at the appropriate positions within the base document. The digitizing tablet may also change the layout of the base document in various ways, e.g., in response to editing the base document. To properly display the annotations within a modified base document, the digitizing tablet should adjust the positions of the annotations so that the annotations continue to mark appropriate content in the base document.

The proper handling of annotations is a challenging task, particularly when the annotations must be redrawn on a modified base document. For instance, different kinds of annotations may have different respective characteristics. This means that different considerations may go into redisplaying different types of annotations on a modified base document. Conventional systems do not employ a mechanism for addressing this kind of complexity in the processing of annotations.

For at least the above-identified reasons, there is a need in the art for more suitable mechanisms for processing annotations.

SUMMARY

An annotation handling system is described for processing annotations added to a base document. In one implementation, the annotation handling system first parses the strokes added to the base document to form a parse tree. The parse tree has nodes associated with one or more of drawing objects; paragraphs; lines; words; and strokes. On the basis of this parsing analysis, the annotation handling system then performs annotation analysis to automatically classify annotations added to the base document. The annotation analysis may specifically comprise determining whether the input strokes form one or more of the following non-limiting list of annotations: a highlight annotation; a blob annotation (comprising an enclosing-type annotation); an underline annotation; a vertical bracket annotation; a call-out annotation; and a free-note annotation. The annotation analysis can output its findings in the form of an annotation parse tree. A reflow engine can use the output of the annotation analysis to properly position the annotations within a layout-modified base document.

Additional exemplary implementations are described in the following. The subject matter set forth in this Summary section refers to exemplary manifestations of the invention, and hence does not limit the scope of the invention set forth in the Claims section.

BRIEF DESCRIPTION OF THE DRAWINGS

FIGS. 3-8 show different exemplary types of annotations that can be processed by the annotation handling system of FIG. 2.

Figure 1:
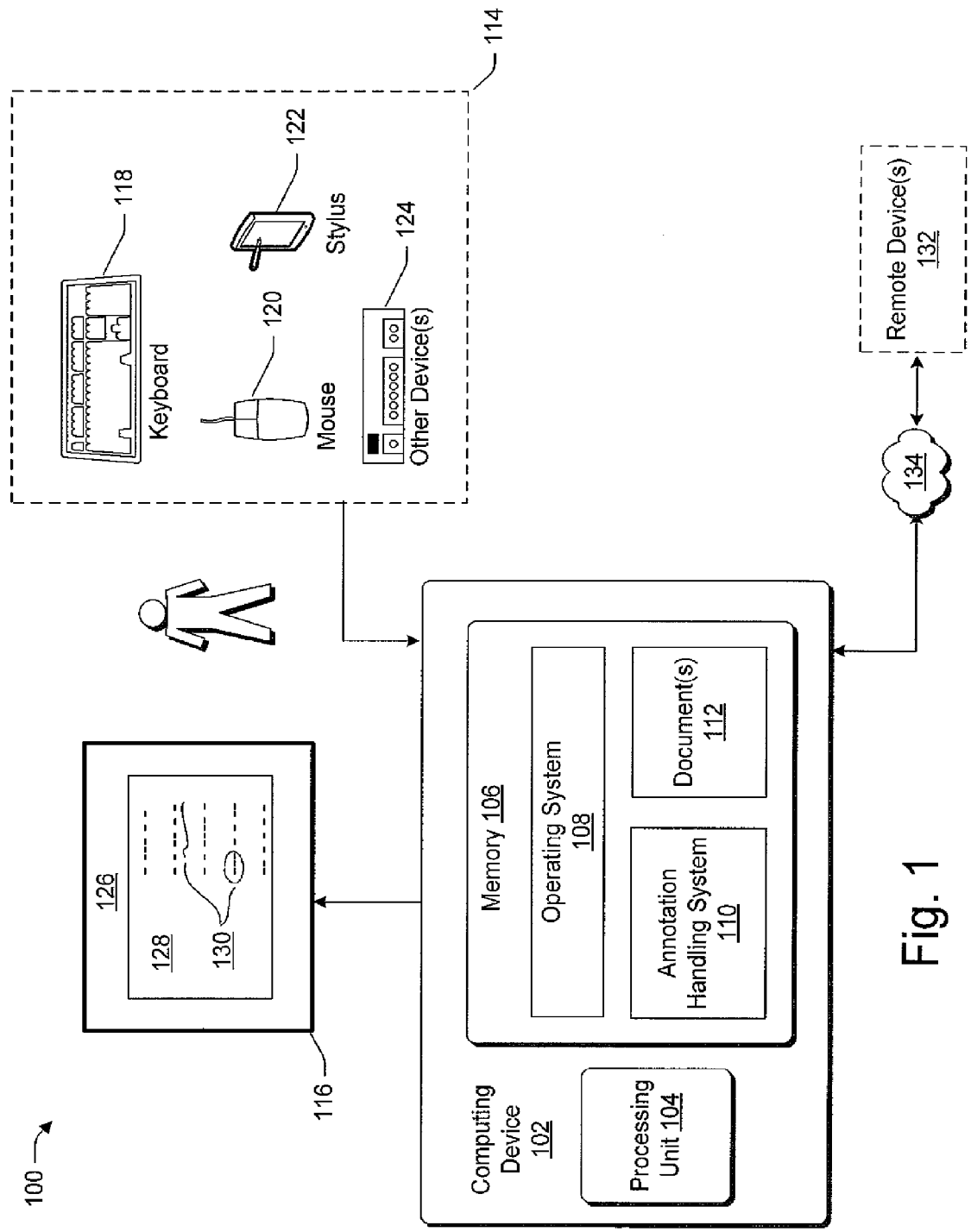
FIG. 1 shows an exemplary environment for processing annotations added to a base document.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure sets forth functionality for handling annotations added to a base document. The handling includes classifying the types of annotations and determining anchoring information which links the annotations to the base document. According to one application, a reflow engine can use the classified annotations and associated anchoring information to help position the annotations in the base document when the layout of the base document changes.

As to terminology, the term "base document" can encompass any kind of non-handwritten document that can receive the user's annotations. In one case, the base document comprises a document having computer-generated text, images and/or other information, such as a word processing document, an Email, a spreadsheet document, a PDF document, any kind of image, and so forth.

The term "ink strokes" (or more simply "strokes") refers to individual marks created by the user using a digitized tablet or like mechanism. That is, a single stroke comprises a trajectory that is traced by a pen between the point in time at which the user applies the pen to the tablet and the point in time at which the user removes the pen from the tablet.

The term "elements" refers to any object within (or added to) a document. An element may correspond to a stroke, as discussed above. Other elements are composed by groupings of strokes. Such composite elements may include, but are not limited to, drawing objects, paragraphs, lines, and words (to be discussed below in greater detail).

The term "anchoring information" refers to words or images in the document that help re-locate the position of an annotation or deform the annotation after the layout of the base document changes. Through the use of anchoring information, the annotation can remain "attached" to the proper content in the base document.

The detailed description includes the following sections. Section A provides an overview of an exemplary environment for handling annotations. Section B provides an overview of an annotation handling system for use in the environment of Section A. And Section C describes in greater detail the operation of annotation engines used by the annotation handling system of Section B.

A. Exemplary Environment for Processing Annotations

Generally, any of the functions described with reference to the figures can be implemented using software, hardware (e.g., fixed logic circuitry), manual processing, or a combination of these implementations. The term "logic, "module" or "functionality" as used herein generally represents software, hardware, or a combination of software and hardware. For instance, in the case of a software implementation, the term "logic," "module," or "functionality" represents program code (or declarative content) that performs specified tasks when executed on a processing device or devices (e.g., CPU or CPUs). The program code can be stored in one or more computer readable media.

More generally, the illustrated separation of logic, modules and functionality into distinct units may reflect an actual physical grouping and allocation of such software and/or hardware, or can correspond to a conceptual allocation of different tasks performed by a single software program and/or hardware unit. The illustrated logic, modules and functionality can be located at a single site (e.g., as implemented by a processing device), or can be distributed over plural locations.

The terms "machine-readable media" or the like refers to any kind of medium for retaining information in any form, including various kinds of storage devices (magnetic, optical, solid state, etc.). The term machine-readable media also encompasses transitory forms of representing information, including various hardwired and/or wireless links for transmitting the information from one point to another.

FIG. 1 shows an example of one environment 100 that can be used to implement the annotation handling techniques described herein. In one implementation, the techniques can be implemented by a computing device 102. The computing device 102 includes conventional hardware components, such as a processing unit 104 (or plural processing units), and various volatile and/or non-volatile memory 106. The memory 106 can include an operating system 108 that performs base operating tasks. The memory 106 can also include functionality which run "on top" of the operating system 108 and utilize its resources. Such functionality can include an annotation handling system 110. The annotation handling system 110 implements the annotation-related tasks described at length below. In this illustrated implementation, the annotation handling system 110 is implemented as machine-readable instructions which perform prescribed operations when these instructions are executed by the processing unit 104.

The annotation handling module 110 can operate on one or more base documents, e.g., by creating and classifying annotations which supplement the base documents. As described above, a base document may comprise any computer-generated document having text, images, and/or other information, such as a word processing document, a spreadsheet document, an Email document, a PDF document, any kind of markup document (such as web-accessible HTML documents, etc.), an image, and so on (or any combination of these documents). FIG. 1 generally shows that the memory 106 can store documents 112, which may represent original base documents without annotations, base documents including annotations, and so on.

A user can interact with the computer 102 via one or more input devices 114 and a display device 116 (or other form of output device). The input devices can comprise a keyboard 118, a mouse device 120, a pen and tablet arrangement 122, or any other kind of input device 124. In particular, the pen and tablet arrangement 122 can be used to enter freehand strokes into the computing device 102. Pen and tablet technology is well known in the art. In one case, the pen and tablet arrangement 122 can be integrated with the computing device 102 to form a single computing unit, commonly referred to in the art as a tablet PC.

The display device 116 can comprise any kind of device for presenting information to a user. In one case, the display device 116 can be incorporated with the pen and tablet arrangement 122. For instance, the display surface defined by the pen and tablet arrangement 122 can serve as both an input device and a display device. In any case, the display device 116 provides a user interface presentation 126. The user interface presentation 126 can display base documents (e.g., document 128) being processed by the computing device 102. The base document 128 includes base content (comprise text, images, and/or other information) as well as one or more annotations 130. The annotations 130 are entered in freehand fashion via the pen and tablet arrangement 122 or through some other mechanism. The annotations 130 supplement the content of the base document 128 by emphasizing certain parts of the base document 128, editing certain parts of the base document 128, and so on. In other words, a user typically annotates the base document 128 in the same circumstances as the user would manually "mark up" a hard-copy of the base document 128 in traditional practice.

The above-described implementation is only one exemplary implementation. In another case, the computing device 102 can represent a server computer that is accessible to one or more remote devices 132 via a network coupling 134. The network coupling 134 can comprise a WAN-type coupling (e.g., the Internet), a LAN-type coupling, or combination thereof In this implementation, a user might create ink strokes using a remote device 132, and the web-accessible computing device 102 can perform the below-described analysis of the ink strokes.

In yet another implementation, the annotation handling system 110 can be implemented in hardware (instead of machine-readable code), or by a combination of machine-readable code and hardware. In yet another implementation, the annotation handling system 110 can be implemented using some other kind of processing device, such as game console, a mobile telephone, a set-top box, a personal digital assistant (PDA) device, and so forth (that is, using any alternative device instead of a conventional tablet PC framework).

The remainder of the disclosure describes the exemplary composition and operation of the annotation handling system 110. To facilitate discussion, certain operations are described as constituting distinct steps performed in a certain order.

Such implementations are exemplary and non-limiting. Certain steps described herein can be grouped together and performed in a single operation, and certain steps can be performed in an order that differs from the order employed in the examples set forth in this disclosure.

B. Overview of the Annotation Handling System

B.1. The Exemplary Composition of the Annotation Handling System

Figure 2:
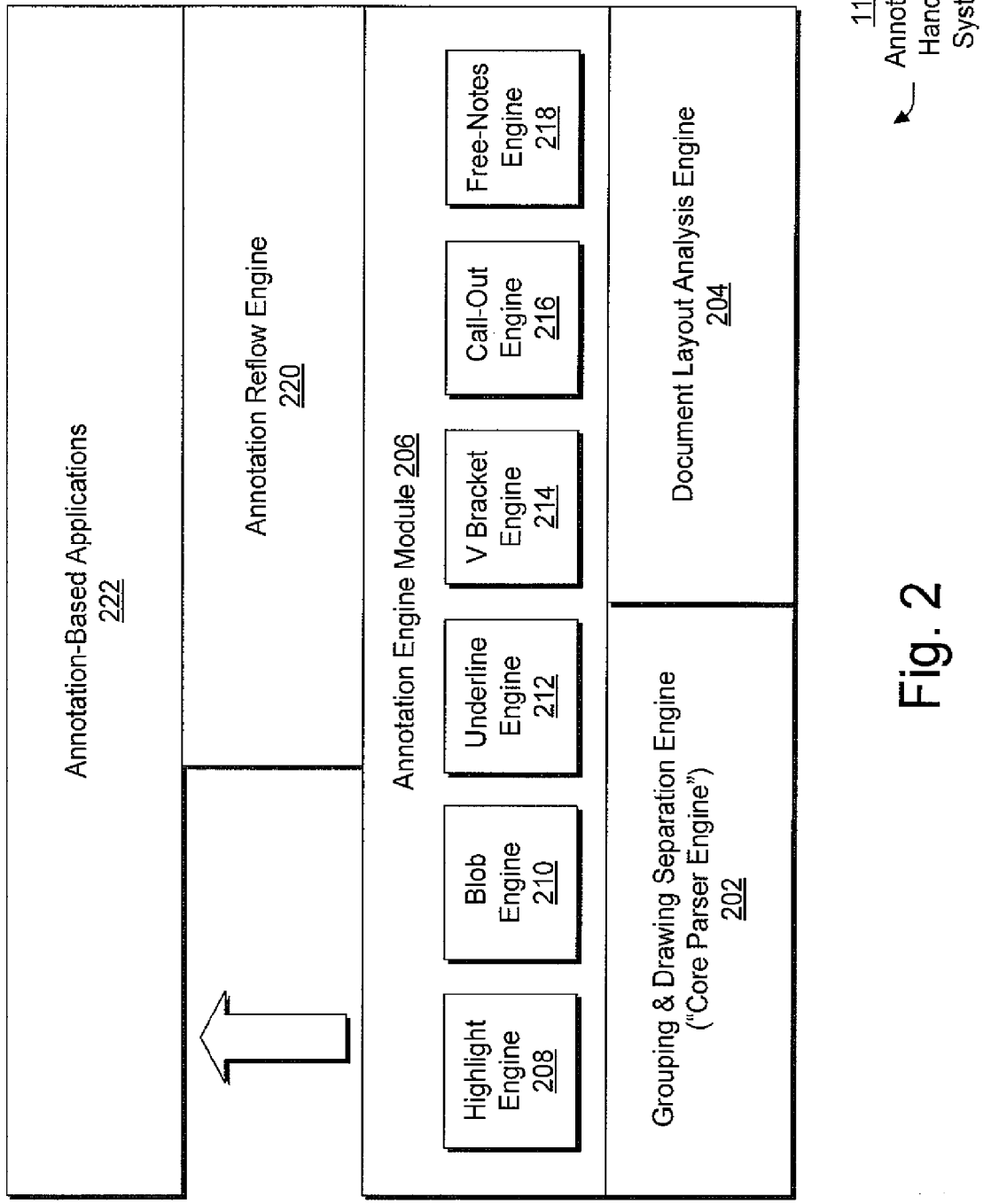
FIG. 2 shows an exemplary annotation handling system for use in the environment of FIG. 1, including a grouping and drawing separation engine (also known herein as a core parser engine), a document layout analysis engine, an annotation engine module (comprising, in turn, plural annotation engines), a reflow engine, and one or more annotation-based applications.

FIG. 2 shows a more detailed depiction of the annotation handling system 110 introduced in FIG. 1. The system 110 includes a series of modules, arranged in a vertical stack. In conventional fashion, if a module is "beneath" another module, this means that the "lower" module performs a foundational operation to produce an output result which can be used by one or more "upper" modules.

The lowest level of the annotation handling system 110 includes a grouping and drawing separation engine 202, referred to below for brevity as a "core parser engine" 202. The core parser engine 202 can comprise several smaller engines (to be discussed in a later subsection). The purpose of this engine 202 is to group ink strokes into words, words into lines, and lines into paragraphs. The core parser engine 202 then discriminates drawing strokes from writing strokes. The core parser engine 202 then groups drawing stokes into drawing objects. The core parser module 202 produces an output in the form of a hierarchical parse tree of nodes (including drawing object nodes, paragraph nodes, line nodes, word nodes, stroke nodes, etc.). The lowest level of the annotation handling system 110 also includes a document layout analysis engine 204. The purpose of this engine 204 is to analyze the layout of a base document.

The next level of the annotation handling system 110 comprises an annotation engine module 206. As will be discussed in greater detail below, the annotation engine module 206 receives input from the core parser engine 202 in the form of the above-described hierarchical parse tree. The annotation engine module 206 also receives input from the document layout analysis engine 206. The purpose of this module 206 is to classify the types of annotations that supplement the base document. This module 206 also determines anchoring information which links the annotations to specific content in the base document. Note that the annotation engine module 206 performs its analysis based on the preliminary analysis already performed by the core parser engine 202, rather than on the raw uninterrupted stroke information. Performing interpretation based on the high-level objects produced by the core parser engine 202 is advantageous because it improves the reliability and efficiency of annotation classification.

The annotation engine module 206 can include one or more engines for processing specific respective types of annotations. More specifically, FIG. 2 shows that the annotation engine module 206 includes an exemplary six types of annotation engines to process six different types of annotations. However, this implementation is representative and non-limiting. In other implementations, additional annotation engines can be used. In other implementations, one or more annotation engines shown in FIG. 2 can be omitted.

The representative six annotation engines include:

A highlight annotation engine 208 classifies highlight-type annotations. FIG. 3 shows an exemplary highlight annotation 302. A highlight annotation is composed of a stroke or strokes that have a special color and width. The highlight marks document elements (such as text) in conventional fashion, such as by passing through one or more words in a line of text. The context of this annotation is defined by the words marked by this annotation in some fashion.

A "blob" annotation engine 210 classifies blob-type annotations. FIG. 4 shows an exemplary blob annotation 402. A blob annotation is composed of a stroke (or a series of strokes, one after another) which encloses (or substantially encloses) one or more document elements. The context of this annotation is defined by the words that this annotation surrounds.

An underline annotation engine 212 classifies underline-type annotations. FIG. 5 shows a first underline annotation 502 comprising a single stroke, and a second underline annotation 504 comprising a series of strokes. In general, an underline annotation is composed of a stroke or a series of strokes that is drawn under lines of a document. The context of this annotation is defined by the words above this annotation.

A vertical bracket annotation engine 214 classifies vertical bracket-type annotations. FIG. 6 shows an exemplary vertical bracket annotation 602. In general a vertical bracket is composed of one or more lines which vertically designate a portion of a base document. The context of the vertical bracket annotation is defined by the lines that are associated with the vertical span of the annotation.

A call-out annotation engine 216 classifies call-out-type annotations. FIG. 7 shows an exemplary call-out annotation 702. In general, a call-out annotation connects one or more elements in a base document to some ink words (or other object). In the case of FIG. 7, for instance, the call-out annotation 702 connects the text element "logic" to the strokes which form the phrase "ask tony." A call-out annotation can optionally possess an arrowhead (or other feature which graphically designates its endpoint). The context of the call-out annotation is defined by the document elements and ink words connected by this annotation.

A free-notes annotation engine 218 classifies free-notes-type annotations. FIG. 8 shows an exemplary free-note annotation 802. As the name suggests, this annotation comprises a note that is added in proximity to some document element that is associated with the document element. For example, in FIG. 8, the free-note text "good" is placed in proximity to the document element comprising the word "combination." The free-note annotation can comprise textual writing and/or a drawing. The context of the free-note annotation is defined by the document element or elements that are closest to the annotation.

Again, the above-identified list of six annotations engines (208-218) is to be construed as exemplary, non-exhaustive, and non-limiting. Additional sections describe the operation of each of the six annotation engines (208-218) in greater detail. In general, and as will be discussed in greater detail below, the output of the annotation engine module 206 defines a hierarchical tree having nodes associated with the different types of detected annotations.

Advancing on to the next higher level in the annotation handling system 110, an annotation reflow engine 220 uses the output of the annotation engine module 206 to properly display the annotations in the base document when the layout of the document is changed for any reason. For example, the document may be edited in any fashion to change it layout, or the document be simply viewed in a different fashion to change its layout. Due to these changes in layout, the content that is being marked by the annotations may change position within the base document. The purpose of the annotation reflow engine 220 to track the position of the annotated content in the base document, and to adjust the position of the annotations so that the annotations continue to be displayed in proper positional proximity to the content. The annotation reflow engine 220 performs this task, in part, based on anchoring information defined by the annotation engine module 206. The annotation reflow engine 220 also performs this task based on a consideration of type of annotation being repositioned. This is because different types of annotations will exhibit different behavior when the layout of the document changes. In other words, different rules apply to the manner in which different kinds of annotations are repositioned when the layout of the document changes.

Finally, one or more annotation-based applications 222 can use the analysis produced by the annotation engine module 206 and the annotation reflow engine 220. These applications 222 can comprise any kind of end-use applications, such as word processing programs, spreadsheet programs, image editing programs, and so forth. The applications 222 can dispense with the reliance on the annotation reflow engine 220 if the document context is static (and therefore the layout of the document should not change).

B.2. Overview of the Core Parser Engine

In the present system, the processing of handwriting documents involves the parsing of the collection of ink strokes. Parsing can be divided into different levels. Given a page of ink strokes, at the beginning of processing there is no a priori knowledge about the ink strokes; that is, the system does not know what will exist in a handwritten note. Therefore, fundamental algorithms, such as word grouping, writing/drawing classification, and drawing grouping, are carried out first. These common modules constitute the core parser engine 202. Based upon the output of the core parser engine 202, objects with semantics can be parsed, such as flowchart and table objects, and so on. With the structures of semantic objects, the ink user interface of editing, beautification, layout and reflow can be supported.

As summarized above, the function of the core parser engine 202 is to perform preliminary analysis on the ink strokes. The result of the analysis is to classify the elements formed by the ink strokes into different categories, including drawing objects, paragraphs, lines, words, and strokes. The annotation engine module 206 operates on the high-level analysis results produced by the core parser engine 202, rather than the raw stroke data itself.

Figure 9:
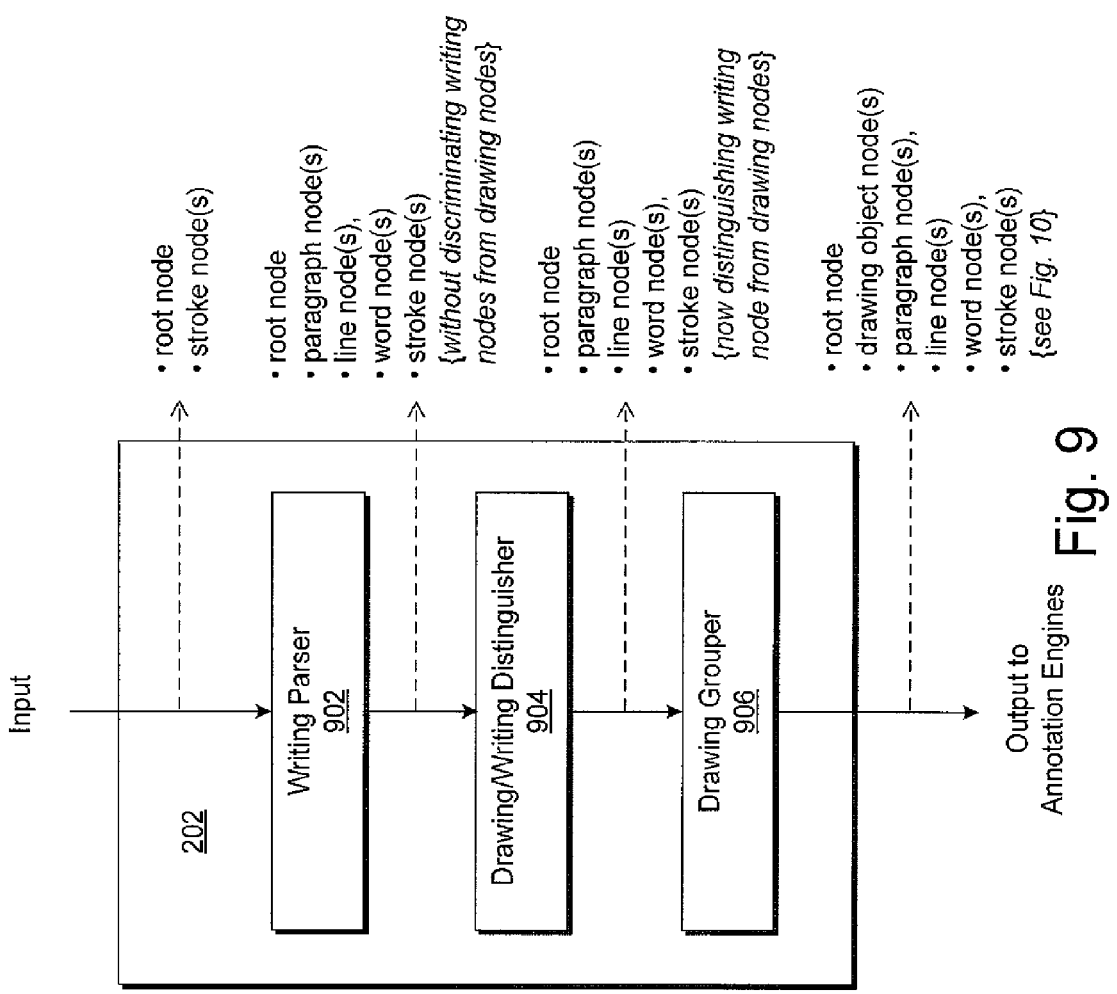
FIG. 9 shows an exemplary operation of a core parser engine of FIG. 2.

FIG. 9 shows an overview of various modules in the core parser engine 202. FIG. 9 also conveys the flow of operations in the core parser engine 202. As shown there, the core parser engine 202 includes three modules (902, 904, 906) that operate in series. Namely, a writing parser 902 operates first. A drawing/writing distinguisher 904 accepts the output of the writing parser 902 and operates second. A drawing grouper 906 accepts the output of the drawing writing distinguisher 904 and operates third. The annotation engine module 206 accepts the output of the drawing grouper 906 and performs annotation classification based thereon.

Each of the modules shown in FIG. 9 accepts an input in the form of a parse tree and generates an output that is also in the form of a parse tree. A parse tree defines a hierarchical data structure that describes the composition of the information entered by the user in freehand fashion using the pen and tablet arrangement 202. The right-hand portion of FIG. 9 shows exemplary nodes in the parse trees at different stages in the analysis performed by the core parser engine 202. As indicated there, the parse trees become progressively richer as analysis proceeds, that is, by incorporating additional types of nodes.

Each of the modules in the core parser engine 202 will be described below in turn.

Starting with the writing parser 902, this module accepts input in the form of a root node and a plurality of ink strokes. The ink stokes define elementary marks made by the user. For example, a user creates a single ink stroke by applying the pen to the tablet, tracing a trajectory of arbitrary shaped path, and then lifting the pen from the tablet. The writing parser 902 groups these strokes into hierarchies of words, lines, and paragraphs (also referred to as blocks). A word is a group of strokes that are expected to be a writing word. A word can be either writing or drawing. A line is a group of words that are expected to be a writing line. A line can be either writing or drawing. A paragraph is a group of lines that are expected to be a writing paragraph. A paragraph can be either writing or drawing. (At this stage, the words, lines and paragraphs do not necessarily correspond to real semantic words, lines and paragraphs.)

Various analyses can be used to detect the occurrence of words, lines and paragraphs, including a combination of feature extraction, dynamic programming, clustering grouping, and post-processing.

Feature extraction bases its analysis on the features of distance, geometric dissimilarity, and linearity. The distance feature refers to a spatial distance between elements. This feature prevents groups of strokes that are far apart from being grouped together. The dissimilarity feature refers to the extent to which elements differ from each other. This feature may help, for instance, reduce the probability that drawing strokes are classified with writing strokes (since these two types of strokes have dissimilar characteristics). The linearity feature refers to a linear regression error in a word or a line. This feature can prevent two words in two lines from being grouped together, because the regression error will be doubled if the two words are grouped as one word. After feature extraction, a fuzzy function is used to combine the features to produce a score. The score represents the probability that the stroke set is a correct group.

Dynamic programming groups the strokes according to temporal information. Namely, the user enters strokes in a certain temporal order, and the computing device 202 can record this temporal order when the user enters the strokes. The dynamic programming can group the strokes based, in part, on the recorded temporal order (based on the presumption that the order in which the user enters the strokes has a bearing on how the strokes should be grouped together).

Cluster-processing groups the strokes according to spatial information associated with the drawing elements, such as position, shape and size.

Post-processing serves as a corrective to the above-described analysis by addressing various exceptional cases, such as the user's entry of "late" strokes (which happens when the user decides to modify a writing or drawing element that was created earlier).

The output of the writer parser 904 is a parse tree having a root node and one or more of paragraph node(s), line node(s), word node(s), and stroke node(s). At this juncture in the analysis, the parse tree does not distinguish whether the various nodes correspond to writing nodes or drawings nodes.

The next module, the writing/drawing distinguisher 904, receives the output of the writing parser 902. The writing/drawing distinguisher 904 operates on this received data to make a determination whether the words identified by the writer parser 902 correspond to writing elements or drawings elements. The distinguisher 904 differentiates writing elements from drawing elements based on various features. Exemplary features include: single word features, such as curvature, density, and handwriting model features; and context features, such as temporal and spatial context features. More specifically, the distinguisher 904 adopts a fuzzy decision architecture, where each feature is mapped to a fuzzy function. The distinguisher 904 provides a final classification result based on a combination of these functions.

The output of the drawing/writing distinguisher 904 is a parse tree having a root node and one or more of paragraph node(s), line node(s), word node(s), and stroke node(s). At this juncture in the analysis, the parse tree now distinguishes whether the various nodes correspond to writing nodes or drawings nodes. However, the drawing elements have not yet been grouped into higher-level objects.

The next module, the drawing grouper 906, receives the output of the drawing/writing distinguisher 904. The drawing grouper 906 operates on this received data to group the drawing strokes and the attached writing strokes into independent objects according to the spatial relationship among these elements. A grid-based approach can be used to perform this task, which may involve: fitting the ink strokes into an image grid with an appropriate size; labeling the image grid to find connected components (where each connected component corresponds to a drawing object); and applying heuristic rules to adjust the drawing objects.

Figure 10:
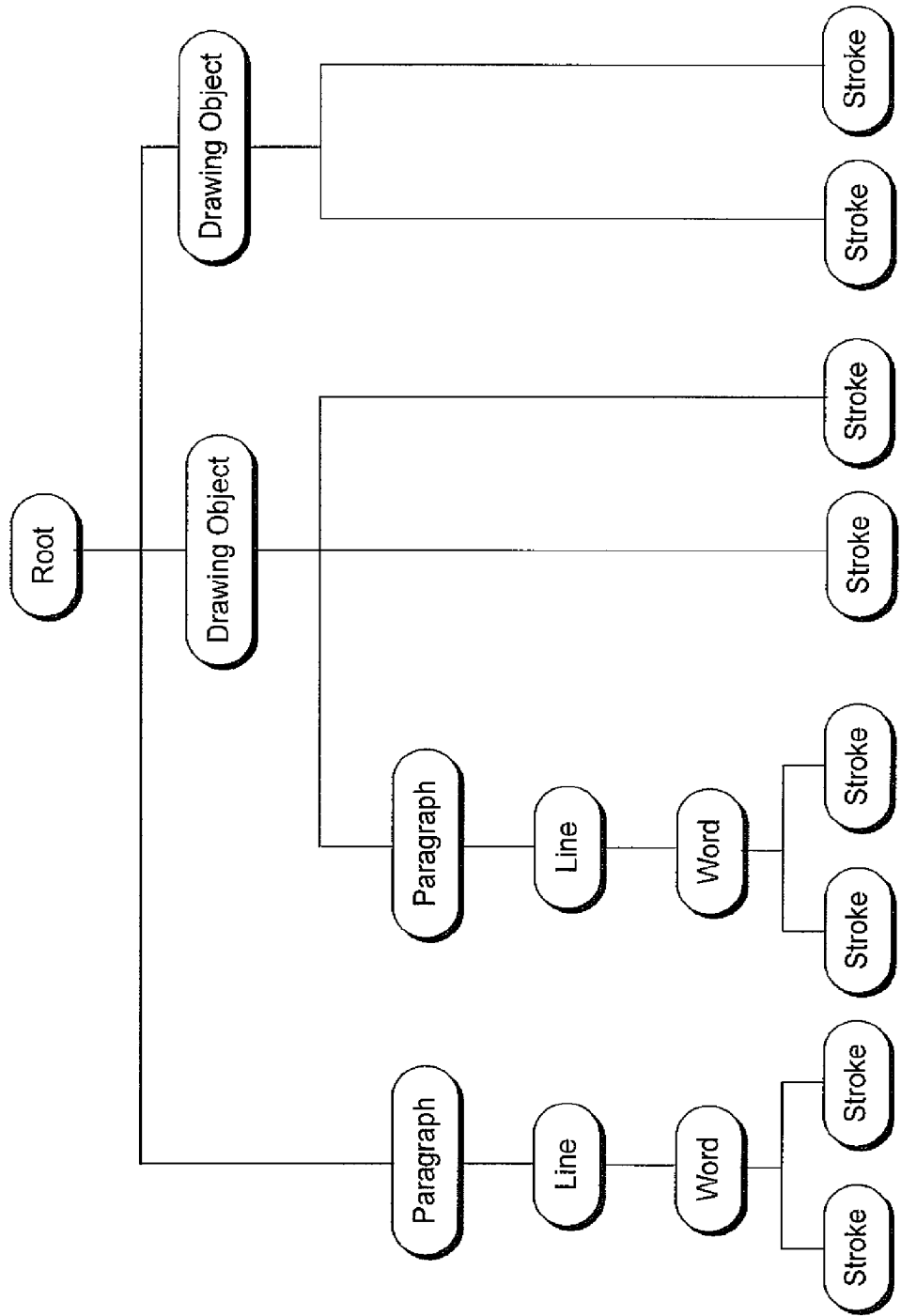
FIG. 10 shows an exemplary output of the core parser engine of FIG. 2.

The output of the drawing grouper 906 is a parse tree having a root node and one or more of drawing object nodes, paragraph node(s), line node(s), word node(s), and stroke node(s). FIG. 10 shows an example of the output of the drawing grouper 906. The output of the drawing grouper 906 is also the input to the annotation engine module 206.

B.3. Overview of the Document Layout Analysis Engine

Figure 11:
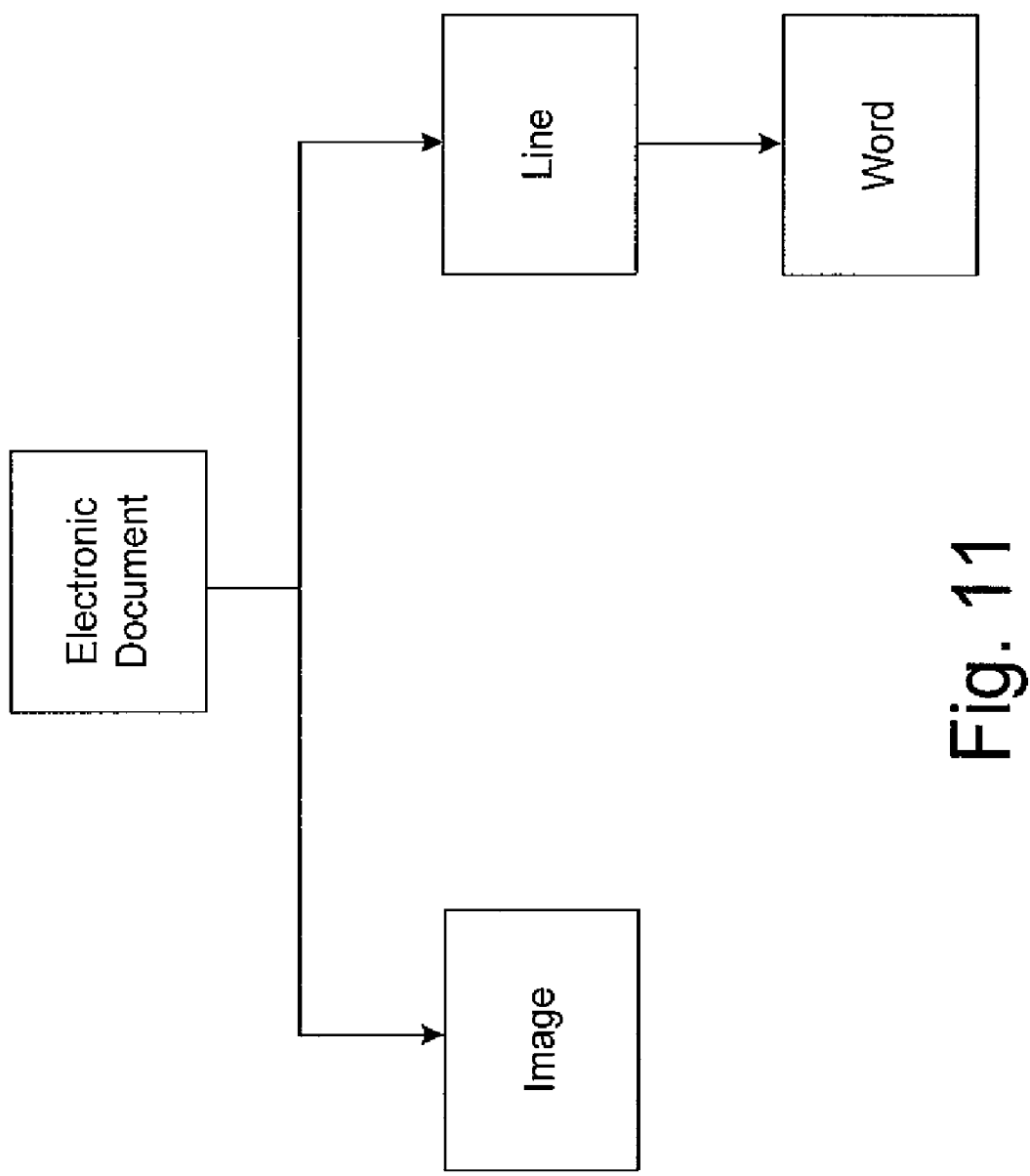
FIG. 11 shows an exemplary output of the document layout analysis engine of FIG. 2.

The document layout analysis engine 204 analyzes the layout of an electronic base document. FIG. 11 shows the exemplary output of the document layout analysis engine 204. As indicated there, the document layout analysis engine 204 determines the composition of an electronic document, including image content, line content, and word content. The output of the document layout analysis engine 204 is also an input to the annotation engine module 206.

C. Additional Details Regarding the Operation of the Engines

C.1. Overview of the Operation

Figure 12:
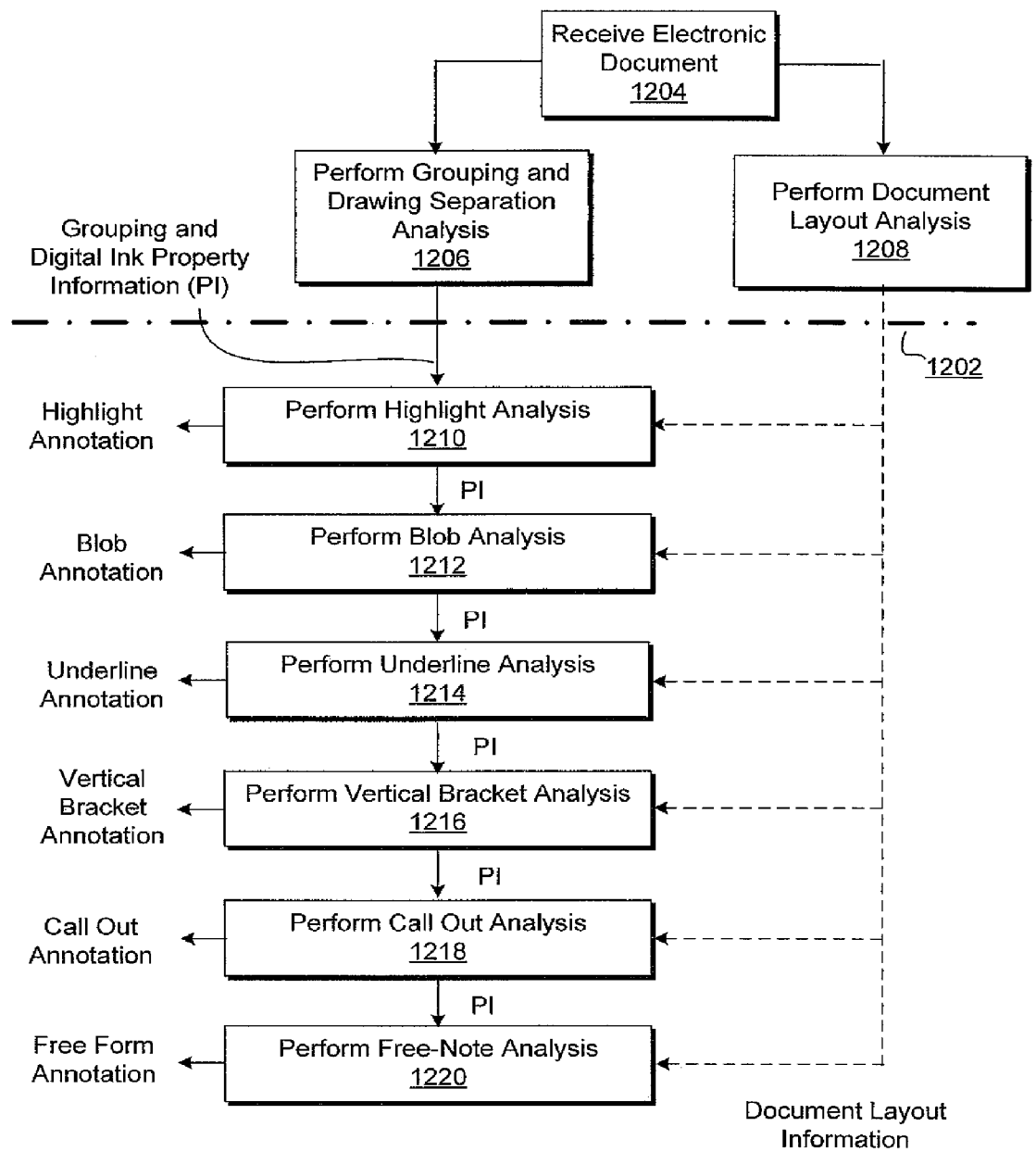
FIG. 12 shows an exemplary operation of the annotation engine module of FIG. 2.

FIG. 12 provides an overview of the operation of the annotation engine module 206. Namely, the operations above the dotted line 1202 in FIG. 12 correspond to tasks performed by the core parser engine 202 and the document layout analysis engine 204, while the operations below the dotted line 1202 correspond to tasks performed by the annotation engine module 206.

To begin, step 1204 entails receiving an electronic document. The document can include strokes that represent annotations added to a base document. The base document may include text, images, or other information (or some combination thereof). The document may comprise a word processing document, an Email document, a markup language document, a PDF document, an image of any kind, and so on.

Step 1206 entails performing grouping and drawing separation analysis (using the core parser engine 202). These operations were described in the previous section. These operations can comprise identifying paragraphs, lines, words, and strokes in the electronic document, distinguishing writing words from drawing words, and then grouping the drawing elements into drawing objects. FIG. 9 represents the output of step 1206.

Step 1208 entails performing document layout analysis. FIG. 11 represents the output of step 1208.

The next series of steps correspond to operations performed by the respective six annotation engines (208-218) of FIG. 2. These engines (208-218) are executed one-by-one in sequential fashion. Each engine receives input based on the results generated in preliminary steps 1206 and 1208. Moreover, one or more engines may benefit from the analysis results of other engines. Each engine produces an annotation result that classifies the annotation into a prescribed type. Each engine also produces anchoring information which helps associate the annotation with content in the electronic document.

Each of the engines is characterized by various operational characteristics, which are identified below. The next subsection provides pseudo-code which comprises one exemplary and non-limiting way to implement the engines.

Highlight Engine

Beginning with the highlight operation performed in step 1210, the highlight engine 208 can rely on the following features to detect the presence of a highlight annotation:

The annotation has special ink properties, such as color and width. An application 222 can inform the highlight engine 208 which stroke has highlight properties.

The annotation is classified as a drawing stroke.

The annotation overlaps text words in the electronic document.

The annotation has a large width to height ratio. The height refers to the vertical range of points in the stroke. The width refers to the horizontal range of points in the stroke.

Additional processing can be performed to improve the analysis and classification of highlight annotations. For example, the highlight engine 208 can perform dynamic programming to determine the presence of multiple-stroke highlight annotations. Moreover, a merging process can be used to absorb (e.g., combine) short highlights.

The anchoring information for the highlight annotation comprises those words which overlap with the highlight annotation.

Blob Engine

In step 1212, the blob engine 210 can rely on the following features to detect the presence of a highlight annotation;

The annotation is formed by a substantially closed stroke or a series of sequential strokes.

The annotation encloses text words or images.

Additional processing can be performed to improve the analysis and classification of blob annotations. For example, the blob engine 210 can perform a merging process to address multiple-stroke blobs. Moreover, the blob engine can execute an image-based method to help validate the enclosing property of the blob.

The anchoring information for the blob annotation comprises those words and images located in the closed area that is annotated by the blob annotation.

Underline Engine

In step 1214, the underline engine 212 can rely on the following features to detect the presence of an underline annotation:

The annotation is classified as a drawing stroke.

The annotation is formed beneath and adjacent to a writing line or lines.

The annotation has a large width to height ratio.

The annotation overlaps with a word in the horizontal direction.

Additional processing can be performed to improve the analysis and classification of underline annotations. For example, the underline engine 212 can perform dynamic programming to determine the presence of multiple-stroke underline annotations. Moreover, a merging process can be used to absorb (e.g., combine) short underlines.

The anchoring information for the underline annotation comprises those words which overlap with the underline annotation.

Vertical-Bracket Engine

In step 1216, the underline engine 214 can rely on the following features to detect the presence of an underline annotation:

- The annotation is classified as a drawing stroke.
- The annotation is located in the margin area of the electronic document.
- The annotation has a large height to width ratio.
- The annotation overlaps with text words in the vertical direction.

Figure 14:
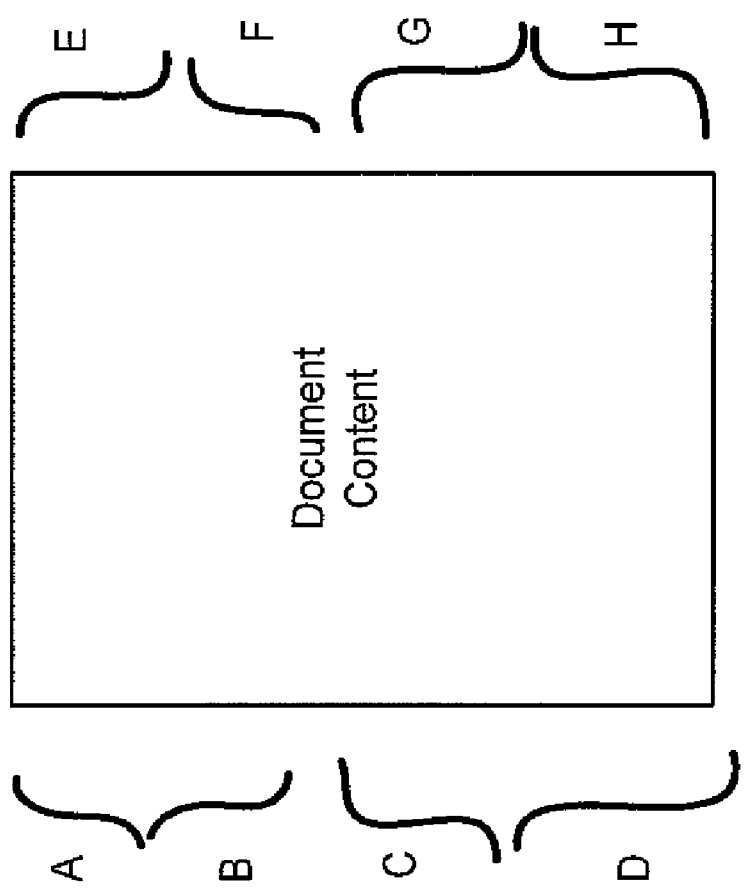
FIGS. 14-18 show various examples which illustrate the operation of the annotation engine module of FIG. 2.

Additional processing and considerations can be performed to improve the analysis and classification of vertical bracket annotations. For instance, dynamic programming can be performed to support multi-stroke vertical brackets. Further, the vertical bracket engine 214 can check direction validity when merging two vertical brackets as an integral bracket. Consider, for instance, the example shown in FIG. 14. As indicated there, strokes A and B can be regarded as a complete vertical bracket. However, strokes B and C can also be considered as a complete vertical-bracket which faces to the left. However, the leftward-facing bracket does not make sense in this context, since these bracket strokes are located on the left part of the document content. The vertical bracket engine 216 can apply this direction-related rule to eliminate vertical bracket merge-candidates The anchoring information for the vertical brackets comprises the consecutive lines that are vertically spanned by the vertical bracket. The vertical bracket engine 216 can consider the bracket's direction when performing this anchoring task.

Call-Out Engine

Figure 15:
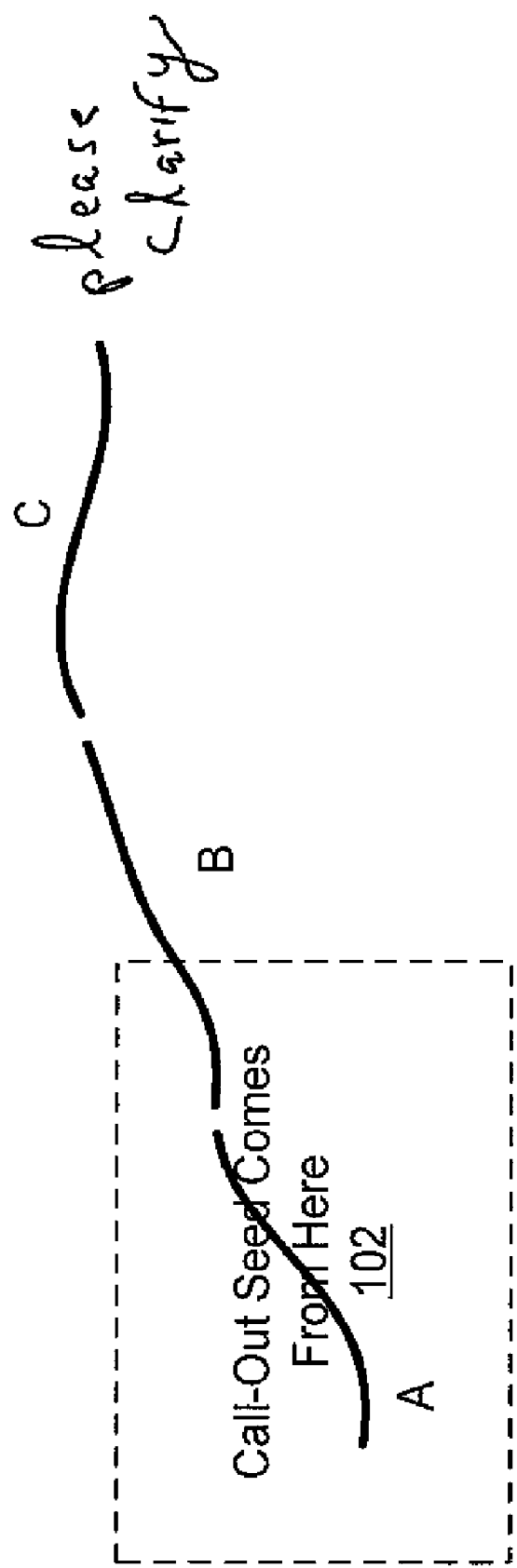

In step 1218, the call-out engine 216 can rely on the following features to detect the presence of a call-out annotation:

- The connector element of the call-out is classified as a drawing element.
- The annotation includes a connector seed element having prescribed properties. Namely, the connector seed comprises a drawing stroke that crosses the border of document content. One end of the connector seeds directs to a word or an image in a document while the other end directs to an ink stroke (or strokes) or to a writing paragraph. This connector seed is the starting point to determine the context of a call-out annotation. For an illustration of the connector seed concept, note FIG. 15. In this example, stroke B comprises the connector seed (because it meets the properties described above), while stroke A and stroke C are not connector seeds.
- The connector connects text words or an image to another ink object (e.g., a writing paragraph or drawing stroke).
- The connector may or may not include an arrow head or other terminal feature.

Additional processing and considerations can be performed to improve the analysis and classification of call-out annotations. For instance, the call-out engine 216 can perform processing to determine if there is any connector which has been incorrectly classified as an underline. If so, the call-out engine 216 can perform an ungroup process to redefine the underline node in the parse tree as a call-out annotation node. According to another processing feature, the call-out engine 216 can perform processing to determine whether there is any connector that has been incorrectly classified as a vertical bracket. If so, the call-out engine 216 can perform an ungroup process to redefine the vertical bracket node in the parse tree as a callout annotation node. Finally, the call-out engine 216 can use a procedure to handle multiple-stroke connectors.

The anchoring information for the call-out engine 216 comprises text words or an image connected by the connector.

Free-Notes Engine

In step 1220, the call-out engine 218 can rely on the following features to detect the presence of a free-note annotation:

- This annotation has a nearby context (text words or an image), where the writing paragraph defines a basic unit.

The anchoring information for the free-note engine 218 comprises the text words or an image whose center is nearest to the center of the free-note.

Figure 16:
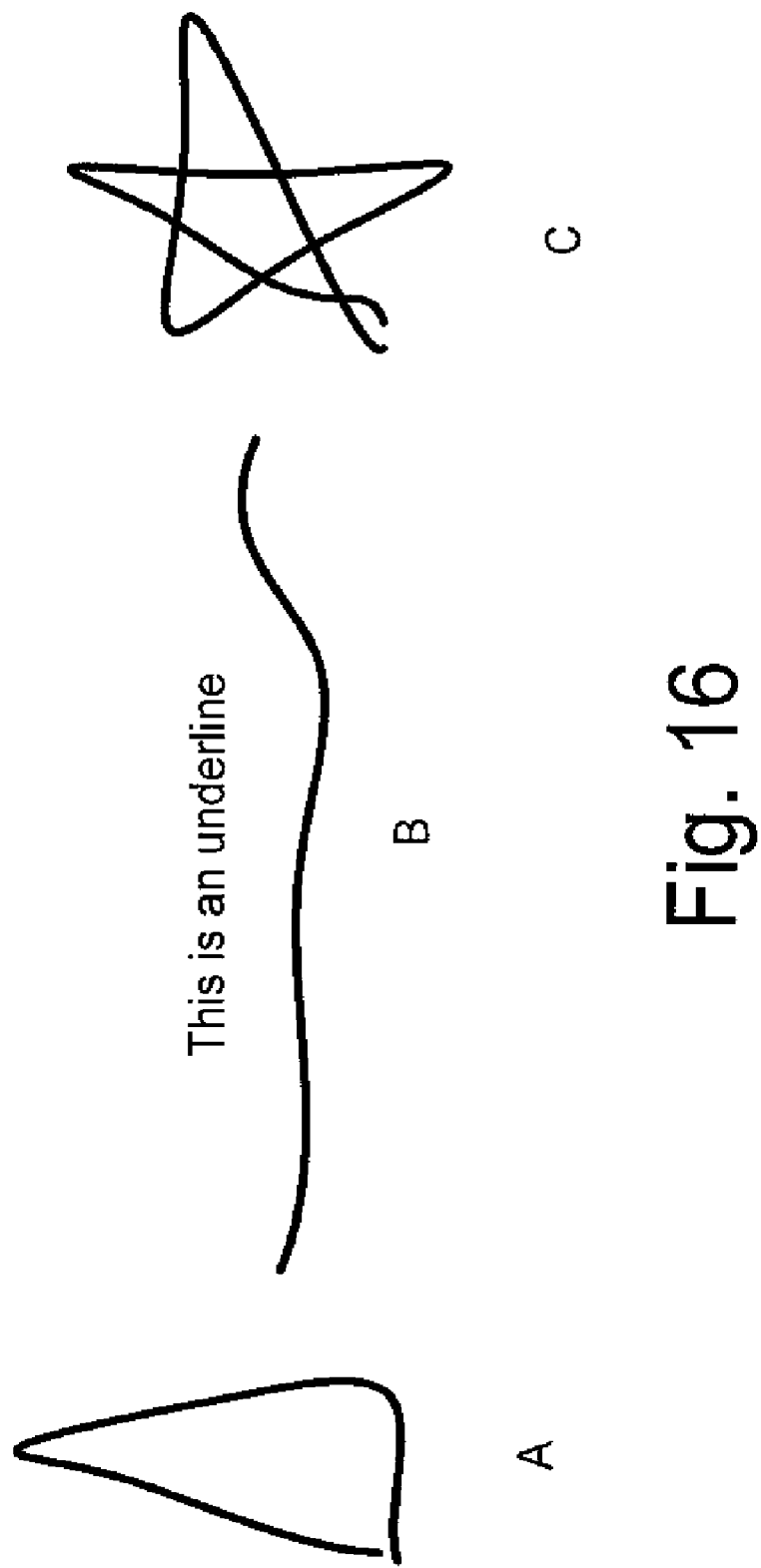

As a general note, an annotation engine may regroup drawing strokes in various circumstances. Note, for example, FIG. 16. As shown there, stroke A, stroke B and stroke C originally compose an integral drawing object. Suppose, however, that the highlight annotation engine 208 subsequently classifies stroke B as an underline, and thus extracts this stroke from the drawing object formed by strokes, A, B and C. Because there is now a large gap between strokes A and C, this means that strokes A and C can no longer be considered as an integral drawing object. To remedy this situation, drawing regrouping can be performed to reclassify drawing strokes A and C as two separate drawing objects.

Figure 13:
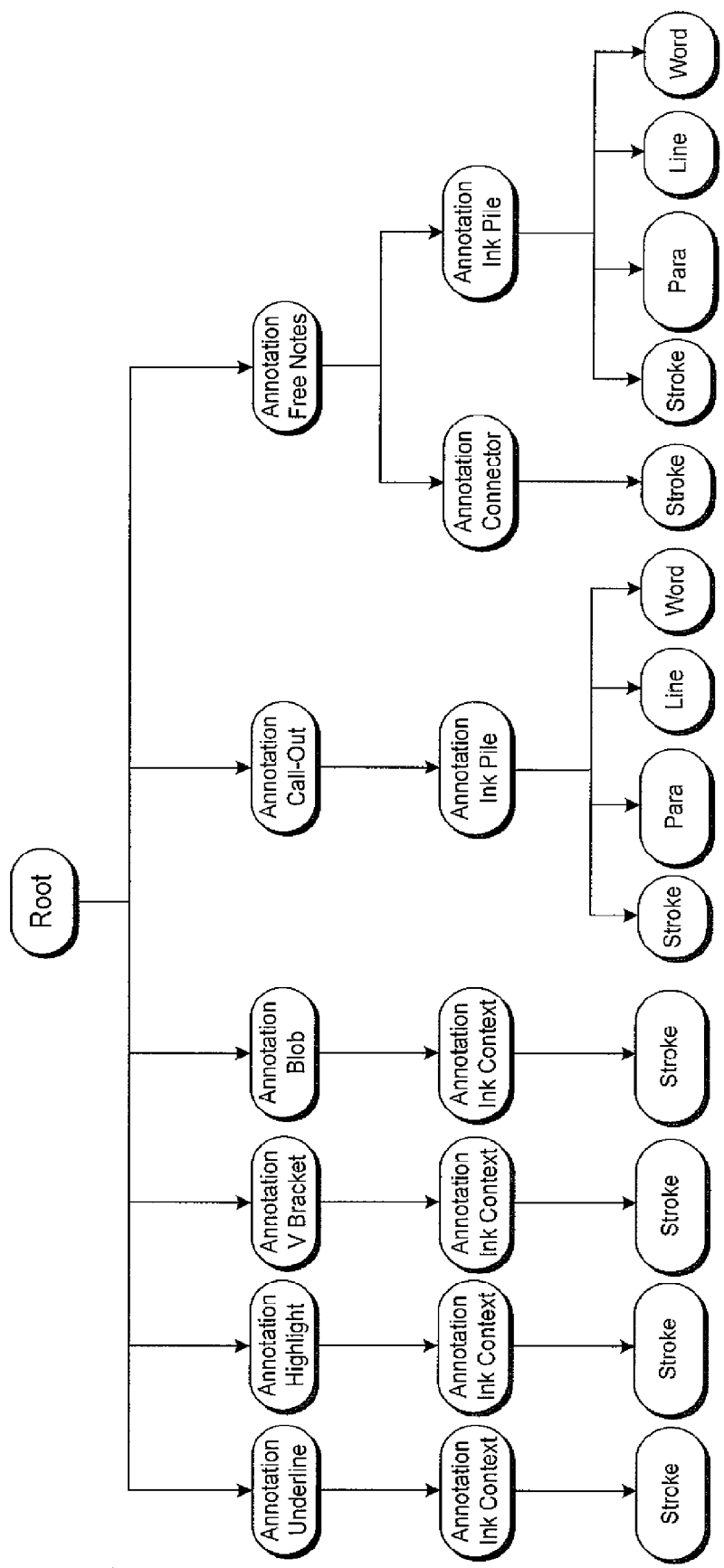
FIG. 13 shows an exemplary output of the annotation engine module of FIG. 2.

FIG. 13 shows an exemplary parse tree output of the annotation engine module 206. As indicated there, the underline annotation, highlight annotation, vertical bracket annotation, and blob annotation each include a node identifying a respective type of annotation, a node representing the context of the annotation, and at least one node representing the strokes that comprise the annotation. The call-out annotation comprises a connector node and an ink pile node. The connector node represents the connector stroke associated with the call-out annotation, while the annotation ink pile is composed of a series of strokes, writing words, writing lines, or writing paragraphs. The free-note annotation comprises an ink pile node. The annotation ink pile is composed of a series of strokes, writing words, writing lines, or writing paragraphs.

C.2. Exemplary Pseudo-Code for the Engines

The following exemplary pseudo-code presents one non-limiting technique for implementing the six engines (208-218) introduced in FIG. 2. The comments in the pseudo-code and descriptive nature of the pseudo-code itself explain the operation of the algorithms.

---

Highlight Engine

```
FOR EACH drawing object
    //Collect highlight candidate strokes
    Put all drawing strokes in HilighiCandiStrokeArray
    FOR EACH stroke S in HilighitCandiStrokeArray
        IF NOT ((S has high-light stroke properties) and (there exist some words or
```

| Highlight Engine |
| --- |
| images which intersect with S)) Then<br>      Remove S from HilightCandiStrokeArray<br>  END IF<br>END FOR<br>Sort HilightCandiStrokeArray by time<br>N = the length of HilighiCandiStrokeArray.<br>  //Let D define an N*N matrix. Each entry of D contains information such as score,<br>  ink strokes, context, bounding box of ink stroke, bounding box of context<br>  //Initialize D<br>  FOR EACH cell in D<br>    cellscore = −1.0<br>    Clear cell.ink<br>    Clear cell.context<br>  END FOR<br>FOR (I = 0; I < N; I++)<br>    cell = D[I][I]<br>    S = HilightCandiStrokeArray [I]<br>    cell.context = (Those text words overlapping with S)<br>    cell.ink = S<br>    cell.inkrect = bounding box of cell.ink<br>    cell.contextrect = bounding box of cell.context<br>    cell.score = cell.inkrect.width / (cell.inkrect.width + cell.inkrect.height)<br>END FOR<br>// Dynamic programming to calculate score<br>FOR step = 1; step < N; step++<br>  FOR row = 0; row < N − step; row++<br>    col = row + step<br>    cell = D[row][col]<br>      //Total score of two cells is calculated using the following rules:<br>      //Let cellI and cell2 be the two cells<br>Let S denotes total score and rect = cell1.inkrect + cell2.inkrect<br>$$S = \begin{cases} cell1.score, & \text{if } cell2.score < 0.0 \\ cell2.score, & \text{if } cell1.score < 0.0 \\ \dfrac{\text{width of rect}}{\text{width of rect} + \text{height of rect}}, & \text{if the two rectangulars overlap in horizontal direction} \\ -1.0, & \text{otherwise} \end{cases}$$<br>      //Let (cell1, cell2) be the pair whose total score is the highest<br>      among //(D[row + 1][col], D[row][row]), (D[row][col − 1],<br>      D[col][col]), //(D[row + 1][col − 1], D[row + 1][col − 1])<br>      cell.score = total score of cell1 and cell2<br>      cell ink = cell1.ink + cell2.ink<br>      cell.context = cell1.context + cell2.context<br>      cell.inkrect = bounding box of cell.ink<br>      cell contextrect = bounding box of cell context<br>  END FOR<br>END FOR<br>//Merge highlight<br>//A cell is considered as a highlight annotation if it satisfies the following conditions:<br>//1. score is higher than a given threshold<br>//2. in horizontal direction, inkrect and contextrect overlap each other<br>//3. context words belong to a single text line in horizontal direction<br> FOR EACH couple of cells (cdli and cell2) in D both of which are considered as<br> highlight annotation<br>    IF cell1.inkrect intersects with cell2.inkrect THEN<br>      Merge cell1 and cell2<br>        IF result in highlight annotation THEN<br>          Merge cell2 into cell1<br>          Cell2.score = −1.0<br>        END IF<br>    END IF<br>END FOR<br>//Merge highlight like cells<br>FOR EACH cell in D which is considered as a highlight annotation<br>    FOR EACH celltemp in N<br>        IF celltemp.score> another given threshold AND celltemp.inkrect is<br>        nearby cell.inkrect THEN<br>          Merge celltemp and cell.<br>          IF result in a highlight annotation THEN<br>            Merge celltemp into cell<br>            celltemp.score = −1.0<br>          END IF |

| Highlight Engine |
|---|
|         ENDIF<br>      END FOR<br>   END FOR<br>   //Put highlight annotation to the parse tree<br>   FOR EACH cell in D which is considered as a highlight annotation<br>      Output cell to the parse free<br>   END FOR<br>END FOR |

| Blob Engine |
|---|
| //Collect blob candidate strokes<br>//Let BlobStrokeCandiArray store the stroke candidates<br>FOR EACH writing block<br>   IF the writing block intersects with some words or images in the document THEN<br>      Add all strokes in the writing block into BlobStrokeCandiArray<br>   END IF<br>END FOR<br>FOR EACH drawing object<br>   IF the drawing object intersects with some words or images in the document THEN<br>      Add all drawing strokes in the drawing object into BlobStrokeCandiArray<br>   END IF<br>END FOR<br>Separate BlobStrokeCandiArray into several stroke clusters by the distance between strokes.<br>FOR EACH stroke cluster<br>   Let StrokeArray denote all the strokes in the stroke cluster<br>   Sort StrokeArray by time<br>   N = the number of strokes in stroke cluster.<br>   //Let D define an N*N matrix, each cell of which stores information such as score, ink,<br>   //context.<br>   //Fill D with score and ink strokes<br>   FOR row = 0; row < N; row++<br>      FOR col = 0; col < N; col++<br>         cell = D[row][col]<br>         cell.score = −1.0<br>         Clear cell.ink<br>         Clear cell.context<br>         IF row > col THEN<br>            Continue<br>         END IF<br>         cell = D[row][col]<br>         cell.ink = StrokeArray[row..col]<br>         cell.score = CalculateBlobScore(cell);<br>         // CalculateBlobScore is defined in the following parts<br>         IF cell.score >= a given threshold THEN<br>            cell.context = those words or images in the convex hull of<br>            cell.ink<br>         END IF<br>      END FOR<br>   END FOR<br>   //Merge blob<br>   //A cell in D is considered as a blob if it satisfies the following conditions:<br>   //1. cell.score >= a given threshold<br>   //2. cell.context is not empty<br>   FOR EACH couple of cells (cell1 and cell2) in D both of which is considered as blob<br>      IF cell1.ink shares any stroke with cell2.ink THEN<br>         IF cell1.score >= cell2.score THEN<br>            cell2.score = −1.0<br>         ELSE<br>            cell1.score = −1.0<br>         END IF<br>      END IF<br>   END FOR<br>   //Merge blob like strokes<br>   Collect those strokes which belong to BlobStrokeCandiArray but do not belong to any<br>   of the blobs in D, and store them in BlobLikeStrokeCandiArray<br>   FOR EACH cell which is considered as a blob in D<br>      FOR EACH stroke in BlobLikeStrokeCandiArray<br>         M = the number of points in stroke which are near the strokes<br>         belonging to cell.ink or in the convex hull of cell.ink<br>         SN = the number of points in stroke |

-continued

| Blob Engine |
|---|

```
            IF M > SN * 0.75 THEN
                cell.ink += stroke
                Remove stroke from BlobLikeStrokeCandiArray
            END IF
        END FOR
    END FOR
    //Output blobs
    FOR EACH cell which is considered as a blob in D
        Output cell to the parse tree
    END FOR
END FOR
//Definition of CalculateBlobScore
CalculateBlobScore(cell)
BEGIN
  Let grid denote a matrix
  Draw all strokes in cell.ink in grid
  Draw the convex hull of cell.ink in grid
  Use grid to calculate the following values:
    SCCR = the number of stroke points near convex hull / the number of point in
        convex hull
    SSR = the number of stroke points near convex hull / the number of stroke points
    ScoreXCircuit = the density of projection of strokes to X axis
    ScoreYCircuit = the density of projection of strokes to Y axis
    ScoreClosed = the density of projection of strokes to a circle whose center is the
        center of grid
    Score = SCCR + SSR
    IF SCCR, SSR, ScoreXCircuit, ScoreYCircuit or ScoreClosed are less then given
        thresholds THEN
            Score = −1.0
    END IF
    IF score < 0.0 THEN
            Score = 0.5
    END IF
END
```

| Underline Engine |
|---|

```
FOR EACH drawing object
    //    Collect underline candidate strokes
        Collect drawing strokes and store them in Underline CandiArray
        FOR EACH stroke in UnderlineCandiArray
            rectangle = bounding box of stroke
            rectangle.top -= a threshold
            IF rectangle does not intersect with any word or image THEN
                Remove stroke from UnderlineCandiArray
            END IF
        FOR
    Sort UnderlineCandiArray by time
    N = the length of UnderlineCandiArray
        //Let D be an N*N matrix. Each cell of D contains information such as score, ink
        // stokes, context, bounding box of ink stroke, bounding box of context
        //Initialize D
        FOR EACH cell in D
            cell, score = −1.0
            Clear cell ink
            Clear cell context
        END FOR
    FOR (I = 0; I < N;I++)
            cell = D[I][I]
            S = UnderlineCandiArray[I]
            cell.context = (words above and adjacent to the stroke S)
            cell.ink = S
            cell.inkrect = bounding box of cell.ink
            cell.contextrect = bounding box of cell.context
                cell score = cell.inkrect.width / (cell.inkrect.width + cell.inkrect.height)
    END FOR
    // Dynamic programming to calculate score
    FOR step = 1; step < N; step++
        FOR row = 0; row < N − step; row++
            col = row + step
            cell = D[row][col]
                //Total score of two cells is calculated using the following rules:
```

-continued

Underline Engine

//Let cell1 and cell2 be the two cells
LetSdenotes totalscore and rect = cell1.inkcrect + cell2.inkrect $$S = \begin{cases} cell1.score, & \text{if } cell2.score < 0.0 \\ cell2.score, & \text{if } cell1.score < 0.0 \\ \dfrac{\text{width of rect}}{\text{width of rect} + \text{height of rect}}, & \text{if the two rectangulars overlap in horizontal direction} \\ -1.0, & \text{otherwise} \end{cases}$$

```
                //Let (cell1, cell2) be the pair whose total score is the highest
                among //(D[row + 1][col], D[row][row]), (D[row][col – 1],
                D[col][col], //(D[row + 1][col – 1]. D[row + 1][col 1])
                cell.score = total score of cell1 and cell2
                cell.ink = cell1.ink + cell2.ink
                cell.context = cell1.contexz + cell2.cont ext
                cell inkrect = bounding box of cell.ink
                cell.centextrect = bounding box of cell context
            END FOR
        END FOR
        //Merge underline
        //A cell is considered as an underline annotation if it satisfies the following conditions:
        //1. score is higher than a given threshold
        //2. in horizontal direction, inkrect and contextrect overlap each other
        //13. context words belong to a single text line in horizontal direction
            FOR EACH couple of cells (cell1 and cell2) in D both of which are considered as
            underline annotation
                IF cell1.inkrect intersects with cell2.inkrect THEN
                    Merge cell1 and cell2
                        IF result in underline annotation THEN
                            Merge cell2 into cell1
                            cell2.score = –1.0
                        END IF
                END IF
            END FOR
        //Merge underline like cells
        FOR EACH cell in D which is considered as an underline annotation
            FOR EACH celltemp in D
                IF celltemp.score > 0.0 AND celltemp.inkrect is nearby cell.inkrect
                THEN
                    Merge celltemp and cell.
                    IF result in a underline annotation THEN
                        Merge ceiltemp into cell
                        celltemp.score = –1.0
                    END IF
                END IF
            END FOR
        END FOR
        // Put underline annotations in parse tree
        FOR EACH cell in D which is considered as an underline annotation
            Output cell to the parse free
        END FOR
END FOR
```

Vertical Bracket Engine

```
FOR EACH drawing object
    //Collect VB candidate strokes
    Collect drawing strokes and store them in VBCandiArray
    FOR EACH stroke in VBCandiArray
            IF the stroke dose not locate in blank area or looks like a closed stroke or a
            question mark THEN
                Remove the stroke from VBCandiArray
            END IF
    FOR
    Sort the VBCandiArray by time
        N = the length of VBCandiArray
    //Let D be an N*N matrix. Each cell of D contains information such as score, ink
    //strokes, context, bounding box of ink stroke, bounding box of context
    //Let DIR be an N*N matrix. Cells of DIR store the direction of corresponding cells
```

-continued

| Vertical Bracket Engine |
|---|

```
// in D
//Initialize D and DIR
FOR EACH cell in D
        cell.score = -1.0
        Clear cell.ink
        Clear cell.context
END FOR
FOR EACH celldir in DIR
        celldir = DIR_NONE
END FOR
FOR (I = 0; I < N; I++)
        cell = D[I][I]
        S = VBCandiArray[I]
        cell.ink = S
        cell.inkrect = bounding box of cell.ink
            cell.score = cell.inkrect.height / (cell.inkrect.width + cell.inkrect.height)
            DIR[I][I] = CalculateDirection(cell)
            //This procedure is defined in the following part
END FOR
//Dynamic programming to calculate score of other cells in D
FOR step = 1; step < N; step++
        FOR row = 0; row < N - step; row++
            col = row + step
            cell = D[row][col]
              // (cell1, cell2) is the pair whose total score is the highest among
              //(D[row + 1][col], D[row][row]), (D[row][col - 1], D[col][col]),
              //(D[row + 1][col - 1], D[row + 1][col - 1])
              //Let S be the highest score.
              //There is a procedure prescribing how to calculate total score of
              two //cells in the following part
              cell.score = S
              cell.ink = cell1.ink + cell2.ink
              cell.context = cell1.context + cell2.context
              cell.inkrect = bounding box of cell.ink
              cell.contextrect = bounding box of cell.context
              //Let celldir be the according cell in DIR of cell
              celldir = direction of cell1 and cell2
        END FOR
END FOR
//Search context
FOR EACH cell in D
        IF cell.score > a given threshold THEN
              celldir = the value of according cell in DIR
              IF celldir == DIR_LEFT THEN
                    cell.context = words or images to left side of cell.inkrect
              ELSE IF celldir == DIR_RIGHT THEN
                    cell.context = words or images to right side of cell.inkrect
              END IF
              cell.contextrect = bounding box of cell.context
        END IF
END FOR
//Merge vertical-bracket
//A cell is considered as a vertical-bracket annotation if it satisfies the following
//conditions:
//1. score is higher than a given threshold
//2. in vertical direction, inkrect and contextrect overlap each other
//3. the density of projection to Y axis is greater than a given threshold
    FOR EACH couple of cells (cell1 and cell2) in D both of which are considered as
    vertical-bracket annotation
        IF cell1.ink intersects with cell2.ink share some strokes THEN
              Merge cell1 and cell2
                    IF result in vertical-bracket annotation THEN
                        Merge cell2 into cell1
                        cell2.score = -1.0
              END IF
        END IF
    END FOR
    // Put vertical-bracket annotations in parse tree
    FOR EACH cell in D which is considered as a vertical-bracket annotation
        Output cell to the parse tree
     END FOR
END FOR
//Calculate Direction of cell
CalculateDirection(cell)
BEGIN
  dir = DIR_NONE
  IF dir == DIR_NONE AND cell.ink locate in left margin THEN
```

-continued

| Vertical Bracket Engine |
|---|

Figure 17:
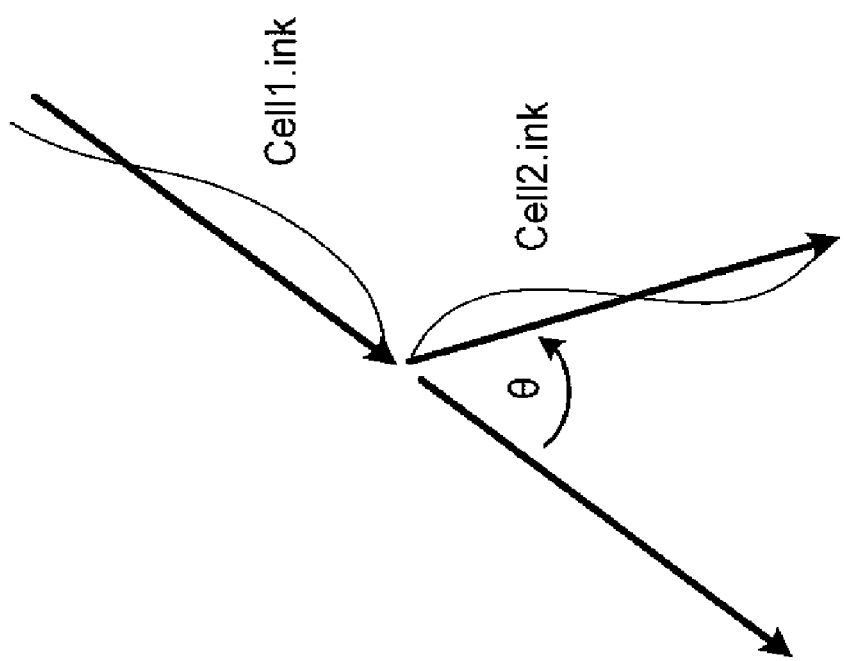

```
        dir = DIR_RIGHT
    END IF
    IF dir == DIR_NONE AND cell.ink locate in right margin THEN
        dir = DIR_RIGHT
    END IF
    IF dir == DIR_NONE THEN
        MidX = the average value of X coordinates of points locate in middle part
        of cell.ink in Y direction
        MidTB = the average value of X coordinates of points locate in top part or
        bottom part of cell.ink
        IF MidX < MidTB THEN
            dir = DIR_RIGHT
        ELSE IF MidX > MidTB THEN
            dir = DIR_LEFT
        END IF
    END IF
    IF dir == DIR_NONE THEN
        Search words or images in left or right side of cell.inkrect
        IF the first word or image is found in left side THEN
            dir = DIR_LEFT
        ELSE IF the first word or image if found in right side THEN
            dir = DIR_RIGHT
        ELSE IF left page boundary is reached THEN
            dir = DIR_RIGHT
        ELSE
            dir = DIR_LEFT
        END IF
    END IF
    Return dir
END
//CalculateScore of two cells
CalculateScore(cell1, cell2)
BEGIN
    IF the direction of cell1 <> the direction of cell2 THEN
        RETURN -1.0
    END IF
    IF cell1.score < 0.0 THEN
        RETURN cell2.score
    END IF
    IF cell2.score < 0.0 THEN
        RETURN cell1.score
    END IF
    Score = -1.0;
    IF cell1.inkrect intersects with cell2.inkrect in horizontal direction THEN
        IF cell1.inkrect in near to cell2.inkrect in vertical direction THEN
            Calculate the turning angle theta illustrated in Figure 17
            direction = the direction of cell1 and cell2
            ANGLE_THRESHOLD = a given threshold
            (Note Fig. 17 which illustrates the direction difference between
            inks of two cells.)
            IF abs(theta) < ANGLE_THRESHOLD OR
                (direction == DIR_LEFT AND theta <= -ANGLE_THRESHOLD)
                OR
                (direction == DIR_RIGHT AND theta >=
                ANGLE_THRESHOLD)
            THEN
                rect = cell1.inkrect UNION cell2.inkrect
                score = reck.hight / (rect.height + rect.width)
            END IF
        END IF
    END IF
    Return score
END
```

| Call-Out Engine |
|---|

```
Collect writing blocks and put writing blocks in WrittingBlockArray
FOR EACH drawing object in the parse tree
    Collect all drawing strokes and put them in NormalDrawingStrokeArray
    //Collect callout seed strokes
    FOR EACH stroke in NormalDrawingStrokeArray
        IF stroke is large enough THEN
```

-continued

Call-Out Engine

Figure 18:
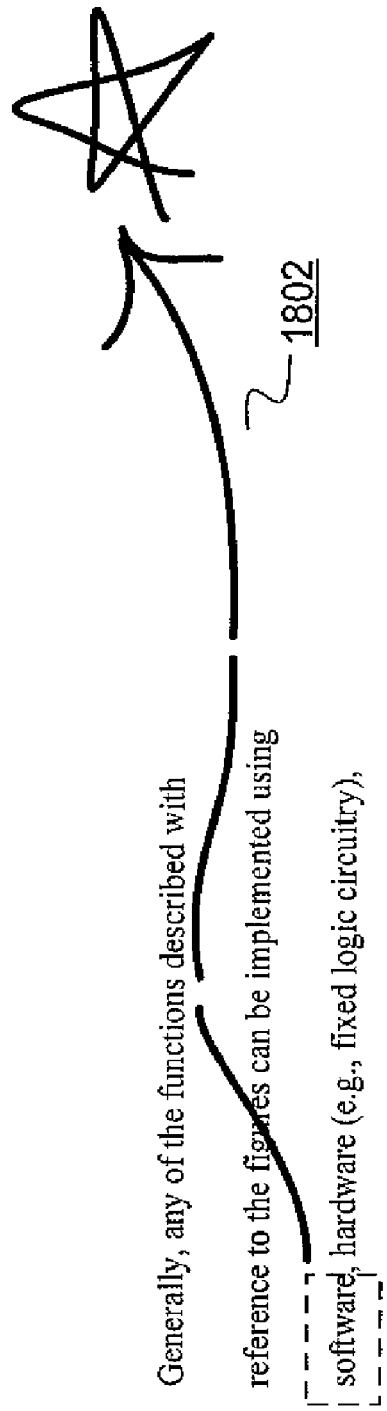

```
            IF one end of stroke is located in a blank area AND the other end of
            stroke directs to a word or image in the document THEN
                    Put stroke into CalloutSeedStrokeArray
                    Remove stroke from NormalDrawingStrokeArray
                END IF
        END IF
END FOR
//Collect callout arrowhead stroke candidates
FOR EACH stroke in NormalDrawingStrokeArray
        IF stroke is small enough THEN
            IF the number of pieces of stroke <= 2 THEN
                    Put stroke into CalloutArrowStrokeCandiArray
                    Remove stroke from NormalDrawingStrokeArray
            END IF
        END IF
END FOR
//Search both document context and ink context for callout seeds
FOR EACH stroke in CalloutSeedStrokeArray
        H denotes one end of the stroke
        T denotes the other end of the stroke
        Search document context from H end and search ink context from T end
        recursively using NormalDrawingStrokeArray and CalloutSeedStrokeArray as
        the search space
        IF succeed THEN
            Composite Document context, ink context and searched path into a
            callout annotation. Put this annotation node in CalloutArray
            Remove strokes in path from NormalDrawingStrokeArray or
            CalloutSeedStrokeArray
        ELSE
            Search document context from H end and search ink context from T
            end recursively using NormalDrawingStrokeArray and
            CalloutSeedStrokeArray as the search space
            IF succeed THEN
                    Composite Document context, ink context and searched
                    path into a callout annotation, put this annotation node in
                    CalloutArray
                    Remove strokes in path from
                    NormalDrawingStrokeArray or CalloutSeedStrokeArray
            END IF
    END IF
END FOR
//Deal with the arrowheads of callout
        FOR EACH callout node in CalloutArray
            Collect strokes in CalloutArrowStrokeCandiArray near the two end points of
            connector
        Add collected strokes into connector
        END FOR
//Output callout nodes
FOR EACH callout node in CalloutArray
        Output callout node to the parse tree
    END FOR
END FOR
//Check underline annotation
FOR EACH underline annotation nodes (denoted by U) in the parse tree
    IF U is compose by only one stroke AND not completely overlapped by its context
        in horizontal direction AND one end of this stroke locates in blank area
        THEN
        Take this stroke as the callout seed.
        If a new callout annotation is found THEN
            Remove U from the parse tree
            Output new callout annotation to the parse tree
        END IF
    END IF
END FOR
//Check vertical-bracket annotation
FOR EACH vertical-bracket annotation nodes (denoted by V) in the parse tree
    IF V is compose by only one stroke THEN
        Take this stroke as callout seed.
        If a new callout annotation is found THEN
            Remove V from the parse tree
            Output new callout annotation to the parse tree
        END IF
    END IF
END FOR
Note FIG. 18 which illustrates the callout search process. The stroke 1802 is the callout
seed. Starting from the seed, through the two other strokes, both the document context
```

-continued

Call-Out Engine (i.e., the word "software") and the ink context (the star-shaped stroke) can be found. The two small strokes at the end of the connector are added onto the connector as its arrowhead. This series of strokes generally defines a multi-stroke callout annotation.

Free-Notes Engine

```
FOR EACH writing block
    IF there exists a word or an image which is nearest to the center of the
    writing block within the current page THEN
        Output this writing block as a free-notes annotation and the word
        or image as anchoring information to the parse tree
    END IF
END FOR
FOR EACH drawing object
    Cluster all drawing ink strokes by spatial information
    FOR EACH stroke cluster
        IF there exists a word or image which is nearest to the center of
        the stroke cluster within the current page THEN
            Output this stroke cluster as a free-notes annotation and
            the word or image as anchoring information to the parse
            tree
        END IF
    END FOR
END FOR
```

In closing, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for processing annotations added to a base document comprising:
   receiving, by an annotation handling computing system, an input that identifies elements added to the base document, the elements including a stroke or a group of strokes, the stroke being an individual mark created by a user on the base document;
   classifying, by the annotation handling computing system, classifying one or more annotations added to the base document based on the received input; and
   generating, by the annotation handling computing system, an output that represents a result of the classifying, the output comprising a hierarchical tree of annotations independent of the base document, the hierarchical tree of annotations identifying different classified types of annotations using different respective types of nodes, wherein:
      each of a highlight annotation, an underline annotation, a vertical bracket annotation and a blob annotation in the hierarchical tree of annotations includes:
         a node identifying a respective type of annotation;
         a node representing context of the respective annotation; and
         one node representing strokes that comprise the respective annotation;
      a free-note annotation includes an ink pile node composed of a series of strokes, writing words, writing lines, or writing paragraphs of the base document that correspond to a free-node annotation; and
      a call-out annotation includes a connector node and the ink pile node, the connector node representing a connector stroke associating the ink pile node with a portion of the base document.

2. The method of claim 1, wherein the base document comprises a document having machine-generated content.

3. The method of claim 2, wherein the machine-generated content includes machine-generated text.

4. The method of claim 1, wherein the received input comprises a hierarchical tree that organizes the elements added to the base document into different types of nodes.

5. The method of claim 4, wherein the types include or more of:
   a drawing object node;
   a paragraph node;
   a line node;
   a word node; or
   a stroke node.

6. The method of claim 1, further comprising using the output of the classifying to modify a position of at least one annotation when a layout of the base document is changed.

7. One or more machine-readable media containing machine readable instructions for implementing the method of claim 1.

8. An annotation handling computing system for processing annotations added to a base document, the annotation handling computing system comprising:
   one or more processors;
   memory communicatively coupled to the one or more processors, the memory having stored instructions that, when executed at the annotation handling computing system, configure the annotation handling computing system to implement:
   a parse engine configured to classify an element added to the base document to provide a parsed output result, the elements including a stroke or a group of strokes, the stroke being an individual mark created by a user on the base document by using a digitized tablet or like mechanism;
   a document layout analysis engine configured to analyze a layout of the base document to output a result of a determination of a composition of the base document, including image content, line content, or word content;
   an annotation engine comprising two or more sub-annotation engines for processing specific respective types of annotations, the annotations being represented by the strokes input by the user to mark supplemental information onto a portion of the base document, the annotation engine module configured to:
      receive the parsed output result as input from the core parser engine;
      receive the result from the document layout analysis engine;
      classify, by the two or more sub-annotation engines, one or more annotations added to the base document based on the parsed output result of the core parser engine and the result of the document layout analysis engine, each sub-annotation engine producing an annotation result that classified the annotation into a prescribed type and anchoring information that associates the annotation with other contents in the base document, the anchoring information being information that links the annotation to a specific content in the base document, the annotation result of one sub-annotation engine being provided to another sub-annotation engine such that the another sub-annotation engine is capable to obtain benefits from the annotation result of the one sub-annotation engine; and generate an output that represents a result of the automatic classification of annotations, the output comprising a hierarchical tree of annotations independent of the parsed out result from the core parser engine, the hierarchical tree of annotations identifying different classified types of annotations using different respective types of nodes;

a reflow engine configured to use the generated output of the annotation engine to track the position of the annotations in the base document and to adjust the position of the annotation to continue to display the annotations in proper positional proximity to other contents of the base document; and one or more annotation-based application configured to use a result produced by the annotation engine and the reflow engine.

9. The annotation handling computing system of claim 8, wherein the parsed output result comprises a hierarchical tree that organizes the elements of the base document into different types of nodes.

10. The annotation handling computing system of claim 9, wherein the different types include one or more of:

a drawing object node;

a paragraph node;

a line node;

a word node; or a stroke node.

11. The annotation handling computing system of claim 8, wherein said two or more sub-annotation engines are selected from a group consisting of:

a highlight annotation engine;

an enclosing-type annotation engine;

an underline annotation engine;

a vertical bracket annotation engine;

a call-out annotation engine; and a free-note annotation engine.

12. The annotation handling computing system of claim 8, wherein the reflow engine is configured to use the generated output of the annotation engine to modify a position of at least one annotation when a layout of the base document is changed.

13. An annotation engine device for processing annotations added to a base document, the annotation engine device comprising:

one or more processors;

memory communicatively coupled to the one or more processors, the memory having stored instructions that, when executed at the annotation engine device, configure the annotation engine device to implement:

multiple annotation engines configured to:

receive an input that identifies elements added to the base document, the elements including a stroke or a group of strokes, the stroke being an individual mark created by a user on the base document by using a digitized tablet or like mechanism, wherein the received input comprises a hierarchical tree that organizes the elements added to the base document into different types of nodes;

classify one or more annotations added to the base document based on the received input; and generate an output that represents a result of the automatic classification of annotations, the output comprising a hierarchical tree of annotations independent of the input hierarchical tree, the hierarchical tree of annotations identifying different classified types of annotations using different respective types of nodes, wherein the multiple annotation engines include two or more of following annotation engines:

a highlight annotation engine;

an enclosing-type annotation engine;

an underline annotation engine;

a vertical bracket annotation engine;

a call-out annotation engine;

a free-note annotation engine.

\* \* \* \* \*

UNITED STATES PATENT AND TRADEMARK OFFICE
CERTIFICATE OF CORRECTION

| | | |
|---|---|---|
| PATENT NO. | : 7,836,390 B2 | Page 1 of 1 |
| APPLICATION NO. | : 11/275750 | |
| DATED | : November 16, 2010 | |
| INVENTOR(S) | : Zhouchen Lin et al. | |

It is certified that error appears in the above-identified patent and that said Letters Patent is hereby corrected as shown below:

In column 27, line 47, in Claim 1, before "one" delete "classifying".

Signed and Sealed this
Second Day of August, 2011

David J. Kappos
*Director of the United States Patent and Trademark Office*